Dec. 17, 1968   V. J. BORNZIN   3,416,254
SONIC FISHING LURE
Filed July 14, 1966
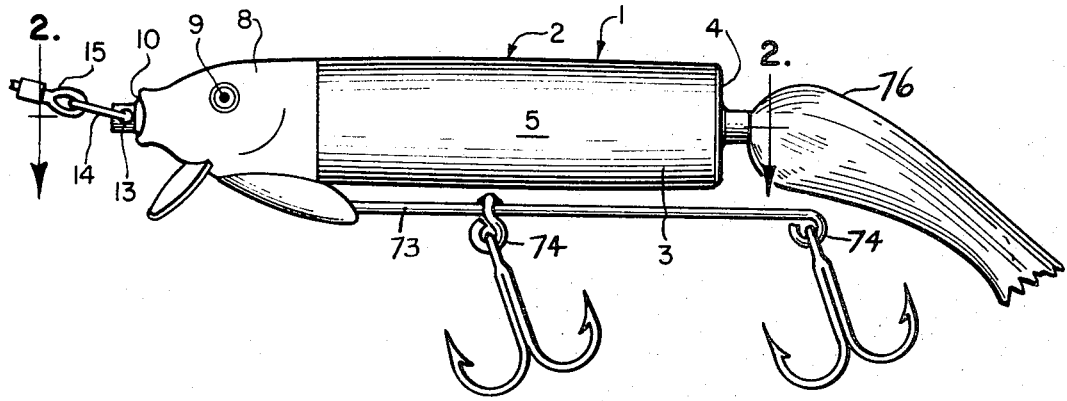
FIG. 1
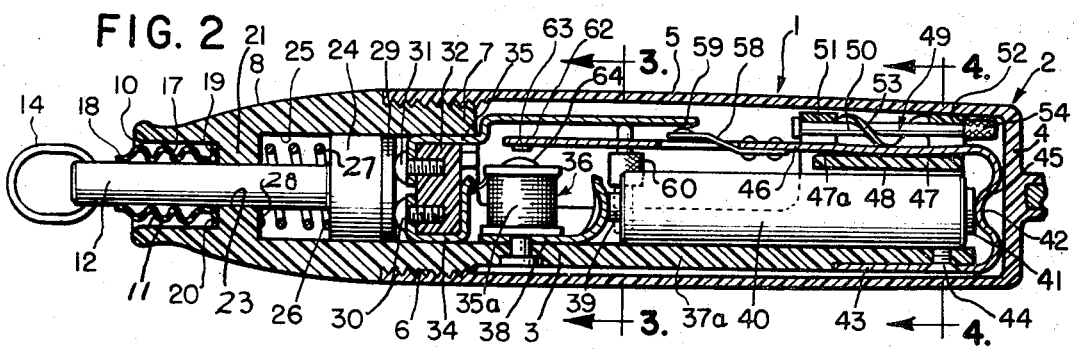
FIG. 2
FIG. 3
FIG. 6
FIG. 4
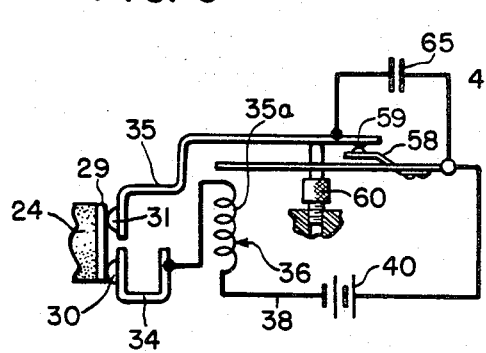
FIG. 5
INVENTOR.
Verl J. Bornzin
BY
John J. Kowalik
Attorney

United States Patent Office 3,416,254
Patented Dec. 17, 1968

3,416,254
SONIC FISHING LURE
Verl J. Bornzin, 2121 Robin Crest Lane,
Glenview, Ill. 60025
Filed July 14, 1966, Ser. No. 565,324
9 Claims. (Cl. 43—17.1)

ABSTRACT OF THE DISCLOSURE

A fishing lure having a vibratory reed and a helical cam engaging the reed at selected points against a support for lengthening and shortening the reed to adjust its pitch, and a switch sealed to the body of the lure and having a stem sealed to the body of the lure and protruding from the front of the lure and biased in one embodiment to open position and in the other to closed position and displaceable from its position by pull or release of the fishing line to which it is attached.

---

This invention relates to fishing lures and more specifically to a lure which incorporates novel means for producing audible vibrations such as will simulate the sounds of insects.

A general object of the invention is to devise a novel lure which comprises means for producing insect buzzing sounds to attract fish.

A further object of the invention is to provide a novel lure which comprises a battery-operated tunable buzzer to obtain different insect simulating sounds.

A more specific object is to provide a novel lure which has an oscillating reed to provide a buzzing sound, and wherein means are provided to adjust the pitch of the reed to closely emulate the sounds of insects.

The invention contemplates a lure having a water-tight compartment in which there is mounted a battery-operated buzzer comprising a reed which vibrates due to alternate attraction by a solenoid and spring-back and wherein means are provided to lengthen or shorten the reed to change the pitch of the buzzer.

These and other objects and advantages inherent in and encompassed by the invention will become more readily apparent from the specifications and the drawings, wherein:

FIGURE 1 is a side elevational view of my novel fishing lure;

FIGURE 2 is an enlarged longitudinal sectional view taken substantially along line 2—2 of FIGURE 1;

FIGURE 3 is a cross-sectional view taken substantially on line 3—3 of FIGURE 2;

FIGURE 4 is a further cross-sectional view taken essentially on line 4—4 of FIGURE 2;

FIGURE 5 is a diagrammatic circuit diagram of the buzzer of FIGURES 1-4; and

FIGURE 6 is a fragmentary longitudinal sectional view substantially similar to FIGURE 2 of another embodiment of the device.

Description of the invention

Describing the invention in detail and having particular reference to FIGURES 1–5 of the drawings, the fishing lure generally designated 1 comprises a body 2 which includes a cylindrical container or housing 3 having a closed end wall 4 and a cylindrical peripheral wall 5 which is internally threaded at its open end as at 6 whereat it threads onto the male part 7 of the head portion 8 of the body of the lure. The head portion 8 may have a forwardly tapered fish simulating outline including an eye 9 at each side and a mouth 10. The mouth 10 is provided with a bore 11 through which extends a switch stem 12. the stem 12 apertured at its forward end as at 13 and receiving a ring 14 therethrough and the ring 14 serving as an attachment for a swivel leader or fishing line attachment 15 as is well known to those skilled in the art.

The stem 12 is encased in a sealing bellows 17 which may be of any suitable material such as rubber or plastic or synthetic rubber, the sealing bellows having a forward end portion 18 tightly stretched about the stem and an outwardly flared rear end portion 19 which may be suitably adhered by any well-known waterproof adhesive to the external side 20 of a shoulder 21 at the base end of the bore 11. The stem passes through a close fitting opening 23 in the shoulder 21 and behind the shoulder is provided with an enlarged head 24 which slidably fits within a rear bore 25 in the head portion of the lure. The forward side 26 of the stem head 24 provides a seat for one end of a compression spring 27 which is sleeved on the stem 12 and at the other end reacts against the rear side 28 of the shoulder 21.

The stem and head may be of plastic or the like or all of metal. It is here shown as plastic and the rear side of the head is provided with a metal contact plate 29 suitably adhered or connected to the head 24. The contact plate 29 bridges a pair of spaced contact points 30, 31 which may be the heads of screws suitably threaded into a mounting block 32, the screws fixedly mounting to the dielectric block a pair of conductor strips 34, 35, the strip 34 being connected to one end of a solenoid coil 35a of a solenoid generally designated 36. The coil 35a is connected at its other end to a contact strip 38 which is clamped between one end disk of the coil and a skeletal support extension 37a of the head portion. The strip 38 has a transversely bent portion which provides a contact for one end or pole 39 of a battery generally designated 40. The battery lies within the concavity 40a of the dielectric support 37a and at its other end makes contact as at 41 with a contact 42 strip which is somewhat hairpin-shaped having one leg 43 overlapping the rear end portion of the support 37a and fastened thereto as by a screw 44. The bight portion 45 of the element 42 is bent intermediate its ends and has a spring contact with the battery.

The other leg 46 of the element 42 forms an oscillator comprising a reed or vibrator which extends forwardly of the base end portion 47 of support 37a through an elongated slot 47a in the support structure base end portion 47 which provides a wall portion 48 extending longitudinally of the leg 46 and provides a reaction area therefor. The opposite side of leg 46 is engaged by a tuning means in the form of a spiral cam element 49 which has a center core 50 journalled on legs 51, 52 formed integral with portion 47. The core 50 has a spiral flight 53 thereon which engages the leg 46 at different points along its length pursuant to the user turning the cam by manipulating the knurled end portion 54 of the core 50. Thus the reed or leg 46 is clamped between the wall 48 and the flight whereby the vibratable portion of leg 46 is lengthened or shortened. Thus the pitch of the buzz is changed or the reed is tuned. Furthermore, the leg or reed 46 is provided with a leaf spring contact 58 which in the free position contacts a point 59 on the rear end of contact strip 35, the position of which is determined by an adjusting screw 60 threaded into the support 37 and abutting as at 61 the inner side of the strip 35, which is of spring material and inherently biased toward the screw 60.

The free end 62 of the reed 46 is provided with a magnetic slug 63 which is attracted to the magnetic core 64 of the solenoid.

In order to place the lure into operation the fishing line is slackened and the switch spring 27 urges the stem 12 rearwardly thus engaging the contact plate 29 with points 30, 31. The battery oscillator circuit is thus completed as best seen in FIGURE 5 and upon the contacts 58, 59 being closed the solenoid is energized tending to pull the reed 46 thereto thus breaking contacts 58, 59. The resiliency of reed 46 and spring contact 58 biases it to engage contacts 58, 59 and the cycle continues. As soon as the fisherman pulls on the line the stem head is disengaged from contracts 30, 31 and the buzzing ceases. Slackening of the line again starts the buzzing. A capacitor 65 bridges contacts 59, 58 to inhibit arcing.

*Description of FIGURE 6*

In FIGURE 6 parts identical with those of the previous embodiment are identified with the same reference characters. The lure 1a has a body portion 2 with the same buzzing instrumentality as in the previous embodiment. In this embodiment the circuit closing contacts are biased out of engagement by spring 27 which reacts between the rear facing surface 28 and a head 24a of the stem, the head having a plate 29a on its forward side and contact strips 34a, 35a, which correspond to strips 34, 35, have points 30a, 31a in front of the plate 29a so that upon the operator tugging on the line contacts 30a, 31a are bridged completing the circuits.

In each embodiment a novel sonic insect emulating buzzer is provided which is adjustable to vary its pitch. It will be realized that various materials may be used for the reed and it could be a taut wire or musical string hit by a hammer, the string being adjustable to vary its tonal response to provide a most effective sound as experience dictates to attract the fish to the lure. The lure may have a fish hook support 73 connected at its forward end to the underside rear portion of the head and be provided with eyes 74, 74 upon which may be mounted a plurality of hooks 75, 75. The body rear end portion may have a socket for a hair tail or feather display 76.

I claim:

1. A fishing lure having a body, sonic means for emitting insect-simulating sounds carried within the body, and said sonic means comprising a source of electrical potential, oscillator means coupled with said source and comprising a vibratory tunable reed, means for tuning said reed comprising adjustable means for selectively varying the effective length of the reed within the body and thereby varying the pitch thereof.

2. The invention according to claim 1 and said adjustable means mounted for rotation on an axis extending generally lengthwise of the reed and having a helix about said axis and attendant to rotation thereof selectively abuttable at axially displaced areas with the reed.

3. The invention according to claim 1, and said adjustable means comprising a cam element rotatably mounted on the body and having areas of engagement with the reed shiftable lengthwise of the reed.

4. The invention according to claim 1 and said oscillator means including a circuit, and switching means for opening and closing said circuit intermittently.

5. The invention according to claim 4, and said switching means comprising a stem reciprocal in the bore in the body and having one end external of the body and including means attachable to a fishing line, bellows means providing a fluid-tight elongatable seal between the stem and the body, said switching means comprising spaced contacts in the circuit, a head on the stem within the body, spring means reactively stressed between said head and said body urging said head to a first position with respect to said contacts, said stem movable in response to tension being applied to the stem to dispose said head in a second position with respect to said contacts, one of said positions engaging the head with the contacts for closing the circuit and the other of said positions disengaging the head from the contacts and opening the circuit.

6. The invention according to claim 4 and said switching means including spaced contacts in the circuit and a bridging means on the stem, a guide bore in the body and said bridging means guided in said bore and reciprocal between engaged and disengaged positions with respect to said contacts.

7. A fishing lure having a body, means for emitting insect simulating sounds carried in the body, and switch means for activating and deactivating said first-mentioned means comprising a member extending through an aperture in the body and connectible to an associated fishing line and responsive to pull and release thereon, and elongatable sealing means embracing said element and having a sealing connection therewith and with the body accommodating movement of said member to switch closing and opening positions.

8. The invention according to claim 7 and said sealing means comprising a bellows, and said body being of fish form, and said bellows extending from the head of said body.

9. The invention according to claim 8 and a bore in the head of said body, and said bellows complementally fitting into said bore and expanding to close fit within the bore upon collapse of the bellows and upon expansion withdrawing partially out of said bore in the head.

References Cited

UNITED STATES PATENTS

| | | | |
|---|---|---|---|
| 2,577,229 | 12/1951 | Carnes. | |
| 3,083,491 | 4/1963 | Meysan et al. | 43—17.1 |
| 3,310,902 | 3/1967 | Godby | 43—17.1 |

SAMUEL KOREN, *Primary Examiner.*

D. J. LEACH, *Assistant Examiner.*